United States Patent [15] 3,635,662
Lyons [45] Jan. 18, 1972

[54] KAOLIN PRODUCT AND METHOD OF PRODUCING THE SAME

[72] Inventor: Sanford C. Lyons, Bennington, Vt.
[73] Assignee: Georgia Kaolin Company
[22] Filed: Dec. 5, 1969
[21] Appl. No.: 882,806

Related U.S. Application Data

[63] Continuation-in-part of Ser. No. 565,346, July 6, 1966, abandoned, Continuation-in-part of Ser. No. 227,488, Oct. 1, 1962, abandoned.

[52] U.S. Cl. ........................23/110 R, 23/110 P, 106/288 B, 241/24
[51] Int. Cl. .......................................................C09c 1/42
[58] Field of Search ...............23/110; 106/288, 309; 241/24, 241/26

[56] References Cited

UNITED STATES PATENTS 3,171,718  2/1965  Gunn et al. ...............................23/110
3,058,671  10/1962  Billue .....................................241/24
2,904,267  9/1959  Lyons ..................................23/110 X Primary Examiner—Edward J. Meros
Attorney—Buell, Blenko & Ziesenheim

[57] ABSTRACT

A new kaolinite product and method of producing it are provided in which the kaolinite consists predominantly by weight of the 2 to 10 microns (e.s.d.) fraction of washed kaolin originally and prior to delamination including a major percentage of coarse particles greater than two microns (e.s.d.) said washed kaolin having been extruded under pressure of at least 350 pounds per square inch through holes having a diameter of one-sixteenth to seven-sixteenths inches, said fraction having a whiter color than the source material of the same size, a greater diameter thickness ratio than the source material of the same size and substantially better makedown characteristics than those of the fines fraction from the same source.

3 Claims, 4 Drawing Figures 31,000 X
NATURAL KAOLINITE PARTICLES

NATURAL KAOLINITE PARTICLES 2μ-5μ E.S.D.

4800X

DELAMINATED KAOLINITE
PARTICLES 2μ-5μ E.S.D.

INVENTOR.
SANFORD C. LYONS

BY Morse Altman

ATTORNEYS

KAOLIN PRODUCT AND METHOD OF PRODUCING THE SAME

This application is a continuation-in-part of application Ser. No. 565,346, filed July 6, 1966, now abandoned, which was in turn a continuation-in-part of application Ser. No. 227,488, filed Oct. 1, 1962, and now abandoned.

The invention relates to a new kaolin product which has important physical properties such as and almost spontaneous dispersibility in water and in other fluid vehicles such as oil, liquid plastics, and the like which are capable of forming smooth, glossy, opaque, flexible pigmented films. The extraordinary case of dispersion or "make down" of this clay greatly reduces the difficulty normally experienced in dispersing conventional kaolin for the production of homogenous pigmented suspensions. Thus this new kaolin product to a considerable extent obviates the use of chemical deflocculating agents and extensive equipment usually required for dispersing clay. Furthermore, the new product has superior covering power when used as a coating for paper. It has been found that paper so coated has superior gloss and reflectance characteristics.

This new kaolin product also produces unusual and superior ceramic structures, both when used as the sole kaolin component and also when used in combination with finer particles of the same description. These ceramic structures are characterized by a combination, in an unusual degree, of properties of high strength (both dry and fired) with low shrinkage and with a whiter fired color than can be had in ceramic structures containing conventional kaolins of comparable fineness distribution.

The new product consists largely of flakes or plates of kaolinite having a size of from 2 microns to 10 microns equivalent spherical diameter. Kaolinite particles of this description occur sparingly if at all in nature and must therefore be manufactured as hereinafter described.

Kaolin has been mined and put to various uses for a long time but it was not until the early thirties that an epochmaking discovery was made by William T. Maloney and described in U.S. Pat. No. 2,158,987. This discovery that kaolinitic particles under 2 microns (equivalent spherical diameter) differed from larger kaolinitic particles in physical properties other than size led to the development of a huge field of employment of kaolin, namely, as a coating pigment for paper, such coating material being the "fines" of kaolin particles 2 microns or less in size (equivalent spherical diameter). This discovery was verified and explained when in 1950 the electron microscope made possible sufficient magnification of kaolin particles to show that the fines were predominantly hexagonal plates while the coarse fraction consisted predominantly of "stacks" of strongly adhering plates.

Maloney's discovery caused a new by product disposal problem for the kaolin producers since the fines-fraction constitutes only a portion of any crude kaolinitic clay in the case of Georgia kaolin, the greater than 2 microns (e.s.d.) fraction representing, in general, about 40 percent thereof. Most other kaolins in the world have an even higher proportion.

Since there was relatively little industrial use for this coarse fraction, it was inevitable that widespread efforts would be made to grind these larger particles so as to make them acceptable for use in coating, etc., and probably every known device for grinding was again tried at one time or another for this purpose. Even Maloney, in his original patent, mentioned the use of a ball mill, as had others before him but it proved to be so inefficient that he abandoned it in favor of wet classification, with rejection of the byproduct coarse particles.

Typical other attempts to grind the coarse kaolinite particles to reduce the average size was that of Brown, U.S. Pat. No. 2,305,404, Dec. 15, 1942, who (as had other done before him) passed the damp kaolin crude between crusher rolls for the avowed purpose of providing "a simple, inexpensive method of processing certain china clays to provide high-grade coating clay comparable to the finer fractions of clay classified by present known methods." (The "present known method" was that of Maloney, U.S. Pat. No. 2,158,987). For many years before Brown it had been practice to pass lumps of clay between pressured rolls as a part of the blunging operation to form a slurry. Brown may have succeeded at times in breaking up some of the clay particles since he records measured increases in gloss and brightness, but in the more than 20 years since his patent issued, his process has never been commercially successful as far as applicant is aware, partly because not being a "wet" process it could not be adapted to the production of a bleached product, and there is no disclosure in the patent of a fraction of delaminated particles in the size range of 2 to 10 microns (e.s.d.).

Other methods proposed for breaking down kaolinite stacks into smaller particles: (1) kneading as in Milliman U.S. Pat. No. 2,535,647, (2) violent impact by (a) entraining particles in high-velocity streams of liquid or gas as in Asdell U.S. Pat. No. 2,726,813 or Duke U.S. Pat. No. 2,920,832, (b) impinging a stream of slurry against the teeth of a Rafton mill, U.S. Pat. No. 2,448,049, as in Billue U.S. Pat. No. 3,058,671, (3) violent agitation of a thin slurry of kaolin with (a) sand as in Hochberg U.S. Pat. Nos. 2,581,414 and 2,855,156 and later in Duke U.S. Pat. No. 3,097,801 or (b) nylon bits and in Gunn & Morris U.S. Pat. No. 3,171,718, and (4) extrusion of a thick mass under pressure as in Lyons U.S. Pat. No. 2,904,267.

In 1957 Applicant discovered that if a kaolin mass having a moisture content of only 17 percent to 23 percent is forced under a pressure of at least 350 pounds per square inch through small holes in a die plate, the rubbing of the coarse particles against each other under pressure subjected them to shearing stresses of sufficient magnitude to delaminate a significant percentage of the "stacks" with the resultant production of platy particles. This discovery was described in U.S. Pat. No. 2,904,267. Prior extrusion of large quantities of clay masses with higher percentages of moisture and much lower pressure in the extruder was common practice as mentioned in Lyons U.S. Pat. No. 2,356,862, but did not result in any appreciable delamination of coarse particles in the clay. The method described in U.S. Pat. No. 2,904,267 for delamination of stacks is commercially feasible and is in extensive commercial use.

This type of kaolin delamination is not to be confused with the exfoliation of the mineral "dickite" which was first reported erroneously as being "kaolinite" in a paper originally published by Allan B. Dick in 1889 which paper was relied on by J. W. Mellor in his "Comprehensive Treatise on Inorganic Theoretical Chemistry" published in 1925. Shortly thereafter, viz, in 1931, Clarence Ross and Paul Kerr, using the more sophisticated instruments of X-ray diffraction, etc., showed that this mineral which had been described by Dick and by Mellor as being "kaolinite" was, in fact, a different mineral, which they named "dickite" (U.S.G.S., Prof. Pap., U.S. Pat. No. 165 E, pages 151–180). This is referred to in Preliminary Report No. 4, American Petroleum Institute, Project 49, Clay Mineral Standards, pub. by Columbia University, New York, Jan. 1950, pages 48 to 52. As all competent mineralogists now know, dickite is characterized by hexagonal-plate crystal which are many times larger than any which have ever been found of kaolinite, and while it might well be possible to see the individual shape of the dickite particles in an optical microscope, and even see them exfoliated into plates, such is not the case with the many times finer kaolinite stack particles. The laminae of kaolin "stacks" are strongly cohesive so that the application of strong disruptive forces is required to comminute such material.

Gunn & Morris is their U.S. Pat. No. 3,171,718 describe a product produced by grinding kaolin with nylon bits and recovering a portion by fractionation which predominates in particles below 2 microns (e.s.d.) by Stokesian methods. The Gunn & Morris product is generally comparable to that generally used in paper coating since the disclosures of Maloney and is based upon advantageously using that portion of clay whose size lies below 2 microns.

Another discovery by applicant, described in copending application Ser. No. 764,395 filed Sept. 30, 1958, now abandoned was that the whiteness of Georgia kaolin could be materially and measurably increased by first removing all or nearly all of the natural fines fraction of washed kaolin clay, subjecting the coarse fraction to the extrusion underpressure process described in U.S. Pat. No. 2,904,267, then classifying the resultant product to recover the newly formed fines fraction. Since the stain on the particles of natural Georgia kaolin appears to be superficial, the delamination of stacks into platelets exposed broad white faces measurably increasing the whiteness of the fraction as a whole. Since the complete removal of fines from the starting material is not commercially feasible on account of the expense involved, it was found that a maximum of about 20 percent of natural fines could be tolerated in the starting material without objectionably diminishing the measured whiteness of the fines fraction recovered after the delaminating step. After the recovery of the fines fraction from the delaminated clay, the coarser residue was added to a fresh supply of the coarse fraction of washed kaolin for another delaminating treatment.

There has been confusion at times between the terms "brightness" and "whiteness." Brightness is now officially used when referring to the reflectance of the wavelength of 457 millimicrons in the spectrum of a specimen. Whiteness is used to designate the relative uniformity of spectral reflectance of a specimen throughout the range of wave lengths which is thought to extend from 380 (violet) to 700 millimicrons (red). In the paper industry it is now an established practice to define whiteness in terms of "Whiteness Index" which is assumed to be the numerical difference between the percentage reflectances of a specimen at 700 millimicrons and at 400 millimicrons. Thus the Whiteness Index of a perfectly white specimen would be 0, and the whiter the specimen, the smaller the Whiteness Index. American clays generally have a Whiteness Index of about 26, the W.I. of American coating clays ranging from 20 to about 16, whereas the normal range of W.I. of English clays is between 14 to 10. Small numerical differences in W.I. are highly significant in terms of commercial acceptability, and measurements of W.I. are important in maintaining uniformity of quality on a clay product. Applicant initiated the use of W.I. values in determining permissible tolerances in producing a clay of commercially satisfactory whiteness, as for example the percentage of natural fines which can be permitted in clay which is to be extruded under pressure in the production of a clay having a whiteness measuring up to that of the best English clays. As the eminent Lord Kelvin once observed: "I often say that when you can see measure what you are speaking about, and express it in numbers, you know something about it; but when you cannot measure it, when you cannot express it in numbers, your knowledge is of a meager and unsatisfactory kind; it may be the beginning of knowledge, but you have scarcely, in your thoughts, advanced to the stage of *Science*, whatever the matter may be."

The present invention was the discovery that if after the recovery of the fines fraction from a mass of delaminated kaolin, there is a further segregation of a fraction consisting of particles in the size range of 2 to 10 microns (e.s.d.) the resulting product is a substance having new and surprising properties. Micrographic examination of this substance shows it to be composed predominantly of plates (having a diameter/thickness ratio greater than unity) in sizes rarely found in natural clay. This substance is characterized by the low viscosity, ease of "make down" in preparing slurry for coating paper, an low adhesive requirement for paper coating. Its "covering power" as a paper coating is particularly good.

Sample micrographs are reproduced on the drawings, of which,

In each of the figures the linear measure of 1 micron is given. Notwithstanding the invention of the electron microscope, the particle size of submicroscopic particles is regularly determined by the rate of settling in a liquid vehicle such as water, the equivalent spherical diameter (e.s.d.) of a particle being the diameter of a sphere of the same material which would settle at the same rate as the particle. It is well known that flat objects settle more slowly than spheres having the same bulk or mass according to principles first enunciated by C. G. Stokes and commonly referred to as "Stokes' Law."

Figure 1:
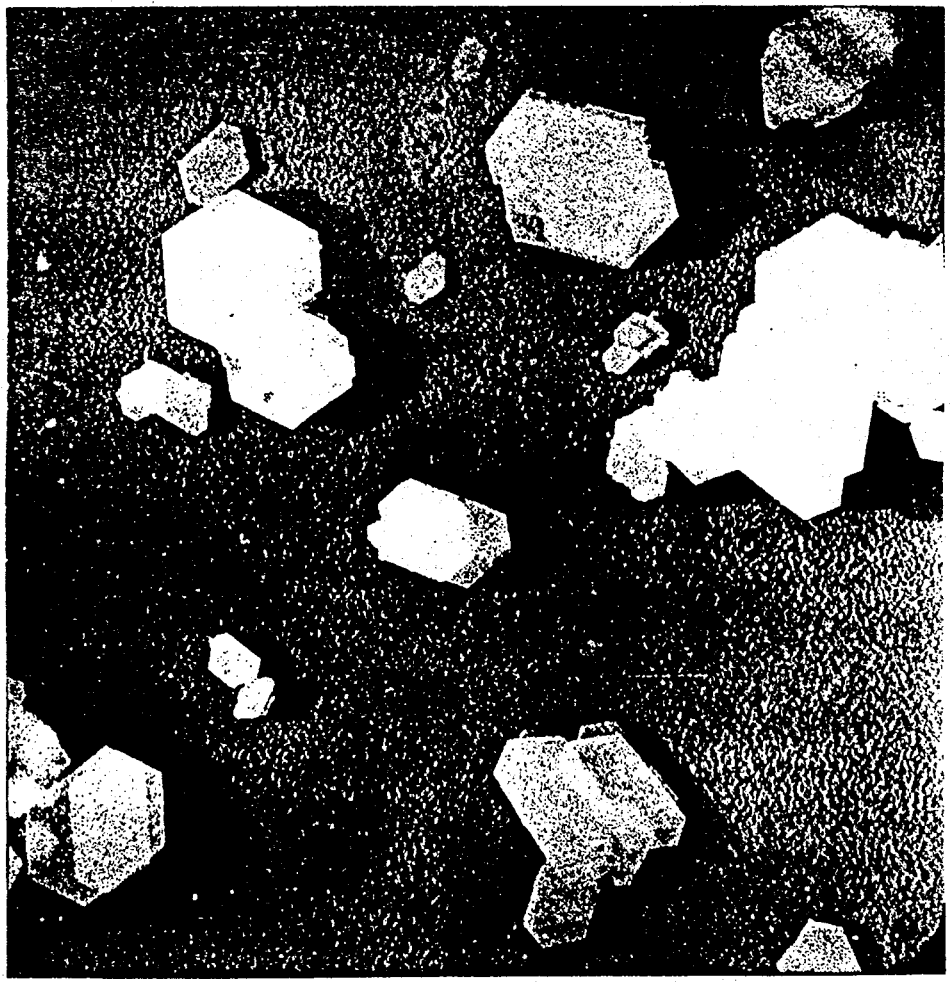
FIG. 1 is a micrograph of natural kaolinitic particles less than 2 microns (e.s.d.) magnified 31,000 diameters.

FIG. 1 is a highly magnified micrograph of some natural kaolinite particles less than 2 microns, (e.s.d.). Their platelike form is evident and accounts for the superior gloss and covering power of the less than 2 micron size.

Figure 2:
FIG. 2 is a micrograph of natural kaolinitic particles mostly from 2 microns to 5 microns (e.s.d.) magnified 4,800 diameters.

FIG. 2 is a micrograph of natural kaolinite particles mostly in the 2 to 5 micron (e.s.d.) range, considerably less highly magnified than the particles shown in FIG. 1. The chunky form of nearly all the particles in that size range is clearly apparent.

This explains why natural kaolin particles of this size, barely larger than the size limit specified by Maloney, i.e., 2 mu (e.s.d.), produce coatings of so markedly lower gloss and opacity than those only slightly finer. In other words, these particles do not exhibit the preferred orientation shown by the flat finer 2 mu particles.

Figure 3:
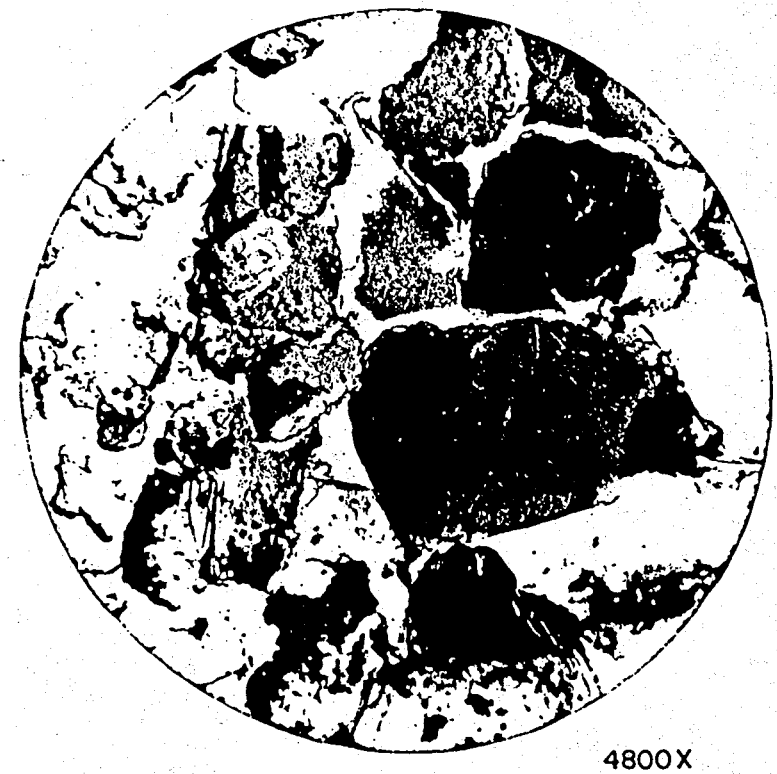
FIG. 3 is a micrograph of artificially delaminated kaolinitic particles mostly from 2 microns to 5 microns (e.s.d.) magnified 4,800 diameters.

FIG. 3 is a micrograph of the new product which consists predominantly of particles of flat platelike shape in the size range of 2 to 5 microns (e.s.d.). This is of the same degree of magnification as FIG. 2 and demonstrates that when the predominant particles in the two samples are compared, those shown in FIG. 3 have far more surface area and are almost all platelike in form.

There was no obvious rational reason to expect that these artificially delaminated kaolin particle systems would exhibit a different correlation between particle size distribution and film-forming properties than did the natural kaolin particles of the same general size. However, service tests soon demonstrated that these new-type particles differed from natural particles of the same size range not only in whiteness but in other ways also. For example, fractions as coarse as 10 microns (e.s.d.) showed markedly glossier film formations than the same fractions of natural particles.

The difference in characteristics between natural and artificial clay fractions of the 2 to 10 micron size is strikingly illustrated in FIGS. 2 and 3 of the drawings and is further attested by laboratory tests on uncalendered coated sheets with the following results.

GLOSS COMPARISON

|  | Natural 2—10 mμ | Delaminated 2—10 mμ |
|---|---|---|
| On paper base | 4.5 | 7.5 |
| On glass | 4.5 | 8.0 |

WAX PICK

|  |  |  |
|---|---|---|
| On paper base | 3.0 | 4.0 |

The foregoing figures show that clays of the same particles size (e.s.d.) in the 2 to 10 micron range have almost twice the gloss if composed largely of delaminated plates. The wax pick test is the well-known Dennison test whereby a series of sticks of wax of increasing hardness are heated to appropriate plasticity and then pressed on the surface of a paper sheet coated with clay. The numbers indicate the hardness of wax required to detach the clay particles from the surface of the sheet.

Figure 4:
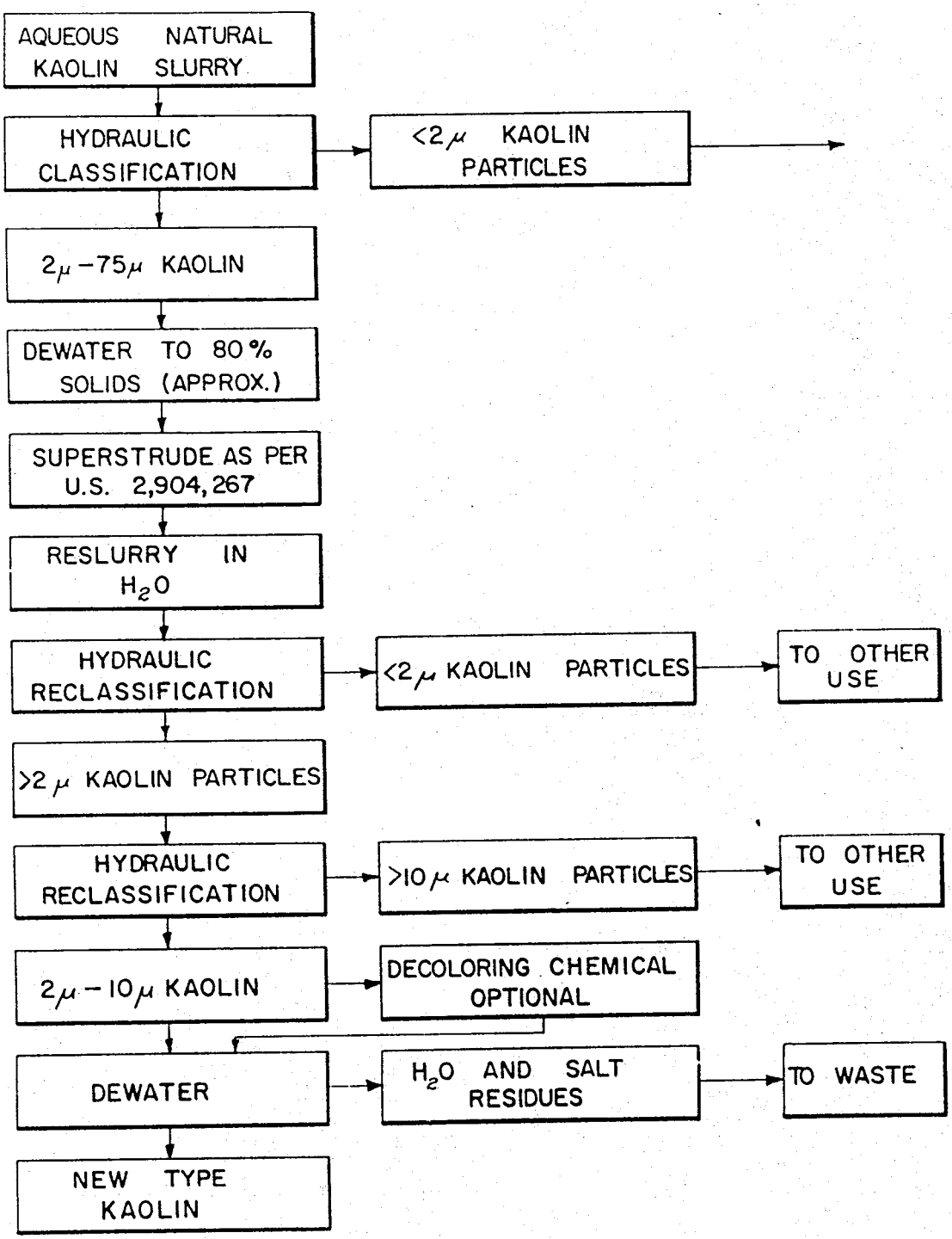
FIG. 4 is a flow sheet of the method steps employed to make the new product.

To obtain the new product, the method indicated in FIG. 4 is followed. Starting with a natural kaolinitic clay which is preferably but not necessarily of the sedimentary type and has been washed to remove particles of foreign matter, a slurry is made for fractionation by any suitable method such as sedimentation or centrifuging to remove as many of the "fines" (less than 2 microns e.s.d.) as possible. Complete removal of fines is not commercially practicable, but a residual percentage up to about 20 percent is tolerable. The resulting coarse fraction (2 to 75 microns, e.s.d.) is then dewatered to a moisture content of approximately 20 percent whereupon the mass is subjected to severe plastic shearing forces by being forced through holes about three-sixteenths inch in diameter under a pressure of at least 350 lbs./sq. in. as described in U.S. Pat. No. 2,904,267. This treatment results in the delamination of many of the "stacks" in the clay with the resultant formation of many platelike particles of various sizes, that is, three-dimensional particles one dimension of which is considerably smaller than the other two dimensions. The extruded clay is reslurried in water and is classified first to remove the fines of less than 2 microns (e.s.d.) and then to remove substantially all the particles greater than 10 microns (e.s.d.). The remainder is predominantly composed of particles in the size range of 2 to 10 microns (e.s.d.) which for the most part are platelike. Particles larger than about 10 microns are found to be significantly less platelike. That is, they lack the relatively high-ratio value between diameter and thickness which is characteristic of plates of the 10 micron (e.s.d.) size and under. By the term "predominantly" in this specification and in the claims I means at least about 75 percent.

Since the Maloney discovery had focused attention on the less than 2 microns fraction of kaolin as being best for coating paper and for other uses, the larger fractions of natural kaolin being unsuitable for such purposes, the segregation of the 2 to 10 microns fraction of the delaminated kaolin was a venture contrary to what was generally accepted practice and resulted in the discovery of a substance having valuable unexpected properties.

The particles of this new product differ from those of the product resulting from the action of fine milling media such as pellets of nylon on a suspension of coarse clay in water. Stereoelectron micrographs show that this new product consists of thin platelike particles whose peripheral outlines are often of irregular, or nongeometric, shape, but whose component laminae are not spread apart, whereas the corresponding particles made by fine-media wet milling, e.g., nylon pellets, are often extensively "feathered out," or even folded back. This particle surface roughness is a cause of serious degeneration of the flow properties of such clays.

My new product has remarkable degree of whiteness by reason of the freshly exposed surfaces on the faces of the delaminated particles. If desired, the product can be treated with any of the usual bleaching chemicals such as hyposulfurous acid or its sodium or zinc salt under an appropriate degree of acidity to produce a further degree of whiteness and brightness.

By reason of the unexpected lammellar or platy shape of its particles, the new product results in much more gloss when applied in pigmented film to a surface than does the same quantity of natural particles in the same size range owing to the tendency of its flat particles to orient themselves parallel to the surface upon which they are sedimented or otherwise deposited. Such films, when applied as a coating to bases such as paper, etc., differ from glossy films obtained by use of the fractions finer than 2 mu (e.s.d.) of either delaminated or natural kaolin platelets, by being less dense or impervious to the fluid vehicles of printing inks which may be impressed upon them. Ink absorptivity tests made by the widely known "K & N ink-smear" technique have shown that coatings on paper containing this new-type clay indicate that the ink is more readily absorbed into the coating film than is the case with comparable coatings embodying natural clay particles. If in any particular instance a lesser degree of absorptivity is desired, this can be had by a judicious blending of fines with this new-type clay. This is a desirable feature for certain types of printing and permits the paper coater to produce coated sheets of whatever degree of ink absorptivity may be desired from kaolin coatings, without undue sacrifices of desired properties such as gloss, opacity and whiteness, which is normally expected only from particles finer than 2 mu (e.s.d.) with their concomitant difficulties of makedown and deflocculation.

Sheets coated with the new-type kaolin exhibit better printability, in general, than comparable sheets coated with natural kaolin platelets.

In the foregoing specification I have set out certain preferred practices and embodiments of my invention, however, it will be understood that this invention may be otherwise embodied.

I claim:

1. As a new product, kaolinite consisting of at least 75 percent by weight of the 2 to 10 microns (e.s.d.) fraction of delaminated washed kaolin which originally and prior to delamination included a major percentage of coarse particles greater than 2 microns (e.s.d.), said washed kaolin having been delaminated by extrusion under a pressure of at least 350 pounds per square inch through holes having diameters in the range of one-sixteenth to seven-sixteenths inch, said fraction having a color which is whiter than that of the source material of the same particle size range, most of the particles of said fraction having a greater diameter thickness ratio than that of its source material of the same particle size distribution, said fraction having substantially better makedown characteristics than those of the fines fraction from the same source.

2. A method of producing clay of markedly improved makedown characteristics comprising the steps of
   a. selecting a washed kaolin material having a major percentage of coarse particles greater than 2 microns (e.s.d.);
   b. extruding said washed kaolin material under a pressure of at least 350 pounds per square inch through holes having diameters in the range of one-sixteenth and seven-sixteenths inch; and
   c. fractionating the product from said extrusion to recover a product consisting of at least about 75 percent by weight of 2 to 10 microns (e.s.d.) particles of kaolinite.

3. A method as claimed in claim 2 wherein the product is chemically bleached.

* * * * *